No. 794,231.

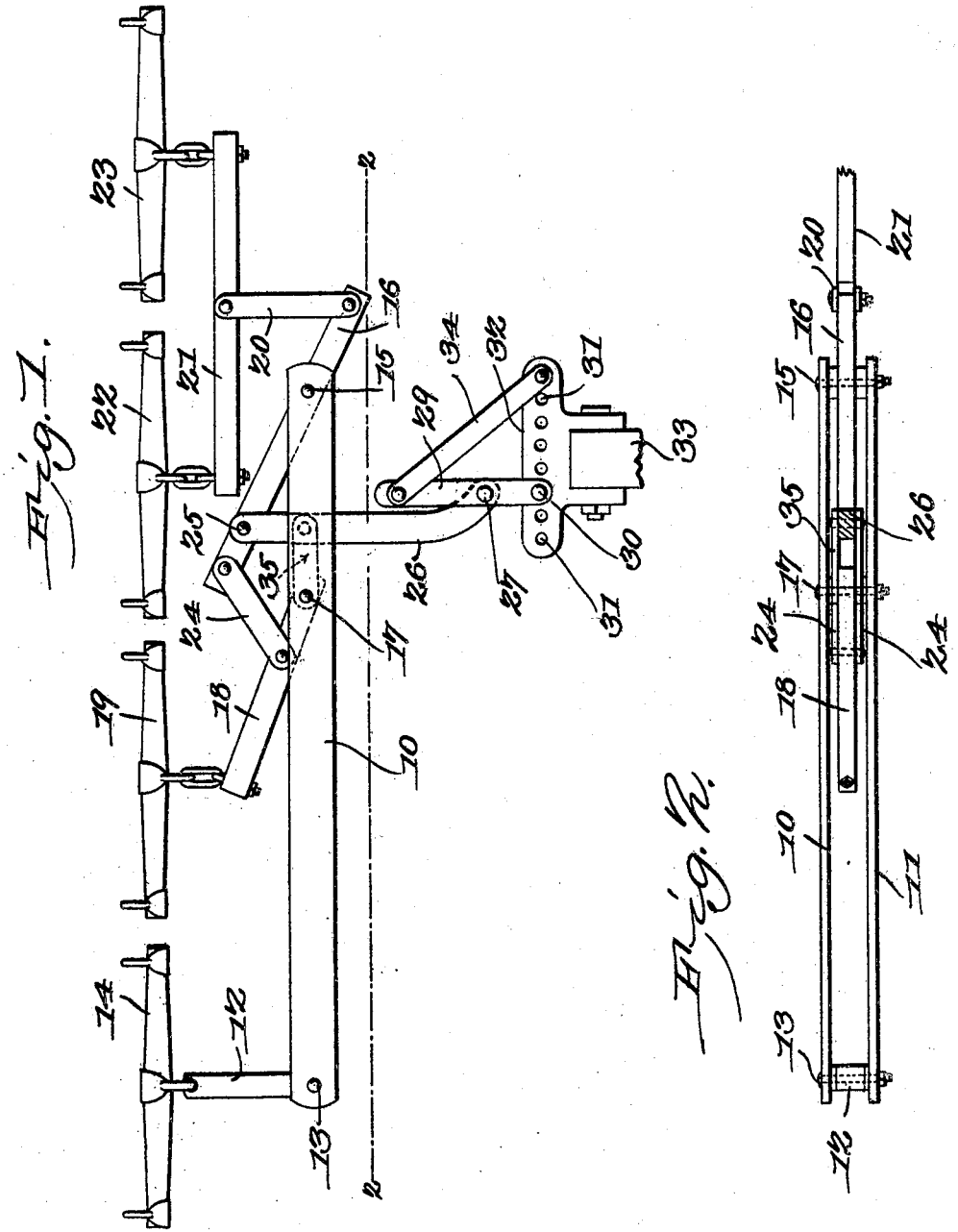

Patented July 11, 1905.

UNITED STATES PATENT OFFICE.

ABEL M. KINDWALL, OF ALBERT CITY, IOWA.

DRAFT-EQUALIZER.

SPECIFICATION forming part of Letters Patent No. 794,231, dated July 11, 1905.

Application filed March 24, 1905. Serial No. 251,825.

*To all whom it may concern:*

Be it known that I, ABEL M. KINDWALL, a citizen of the United States, residing at Albert City, in the county of Buena Vista and State of Iowa, have invented a new and useful Draft-Equalizer, of which the following is a specification.

This invention relates to draft-equalizers, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a plan view, and Fig. 2 is a rear elevation in section on the line 2 2 of Fig. 1 with the double and swingle trees detached.

The improved device comprises a main draft-beam preferably formed of two spaced members 10 11, having a link 12, pivoted, as at 13, between the same at one end and with a swingletree 14 coupled to the free end of the link.

Pivoted at 15 between the opposite ends of the main beam members is a beam 16, which for the purpose of this description is denoted the "primary auxiliary beam," the pivot-point 15 being located about one-third the distance between the ends of the beam 16.

Pivoted at 17 between the main beam members 10 11 is another smaller beam 18, which for the purpose of this description is denoted the "secondary primary beam" and is provided with a swingletree 19, coupled thereto at its free or inner end.

Coupled by a link 20 to the outer or shorter end of the primary auxiliary beam 16 is a doubletree 21, carrying the usual swingletrees 22 23.

Connecting the inner or longer end of the primary auxiliary beam member 16 with the secondary auxiliary beam member 18 at an intermediate point on the same is a link 24, preferably in two parts and disposed upon opposite sides of the members 16 and 18, and pivoted at 25 to the member 16 relatively near the link 24 is a draft-bar 26, extending rearwardly between the beam members 10 11 and offset at the rear end and pivoted, as at 27, to a draft-link 29, the latter in turn pivoted, as at 30, in one of a series of apertures 31 in a clevis 32 on the apparatus to be actuated—as, for instance, the beam of a plow, a portion of which is represented at 33. A diagonal brace 34 is also connected between the clevis and the free end of the draft-link 29 to support the same.

Connected between the pivotal point 17 of the members 10 11 and the beam member 18 and the draft-beam 26 is another link 35, also, preferably, in two parts, disposed upon opposite sides of the member 26.

The relative positions of the draft-beam 33 and the swingletrees 14, 19, 22, and 23 are so disposed that when the horses are attached to the swingletrees the horse attached to the swingletree 23 will travel in the furrow if the device is applied to a plow and all the other horses will travel upon the "land," and when applied to a mower, harvester, or the like machine the horse attached to the swingletree 23 will travel upon the "grain" side of the draft-tongue and the remaining horses upon the land side of the same; but by the novel construction herein shown and described the draft upon the implement being operated will be equalized and all side draft eliminated.

The apparatus is simple in construction, can be inexpensively manufactured, and will operate effectually for the purposes described.

Having thus described the invention, what is claimed is—

1. In a draft-equalizer, a main equalizer-beam having a swingletree coupled thereto at one end, a primary auxiliary beam coupled intermediately thereof at the other end of said equalizer-beam, a doubletree coupled movably at the outer end of said auxiliary beam, a secondary auxiliary beam pivoted at one end to said equalizer-beam intermediately of the same and with a swingletree coupled thereto at the free end, a coupling-link connected at one end to the inner end of said primary auxiliary beam and at the other end to the secondary auxiliary beam and intermediately thereof, a coupling-bar pivoted to said primary auxiliary beam between its pivotal point and said coupling-link, a coupling-link between said coupling-bar and the pivotal point of said main equalizer-beam and said secondary auxiliary beam and means for connecting said coupling-bar to the apparatus to be drawn forward.

2. In a draft-equalizer, a main equalizer-beam formed of spaced longitudinal members and having a swingletree coupled thereto at one end, a primary auxiliary beam coupled intermediately thereof between said spaced main beam members at the other end of the same, a doubletree carrying spaced swingletrees and coupled movably at the outer end of said auxiliary beam, a secondary auxiliary beam pivoted at one end between said main equalizer-beam members and intermediately thereof and with a swingletree coupled thereto at the free end, a coupling-link connected at one end to the inner end of said primary auxiliary beam and at the other end to the secondary auxiliary beam and intermediately thereof, a coupling-bar pivoted to said primary auxiliary beam between its pivotal point and said coupling-link and extending rearwardly between said main beam members, a coupling-link between said coupling-bar and the pivotal point of said main equalizer-beam and said secondary auxiliary beam, and means for connecting said coupling-bar to the apparatus to be drawn forward.

3. In a draft-equalizer, a main equalizer-beam having a swingletree coupled thereto at one end, a primary auxiliary beam coupled intermediately thereof at the other end of said equalizer-beam, a doubletree coupled movably at the outer end of said auxiliary beam, a secondary auxiliary beam pivoted at one end to said equalizer-beam intermediately of the same and with a swingletree coupled thereto at the free end, a coupling-link connected at one end to the inner end of said primary auxiliary beam and at the other end to the secondary auxiliary beam and intermediately thereof, a coupling-bar pivoted to said primary auxiliary beam between its pivotal point and said coupling-link, a coupling-link between said coupling-bar and the pivotal point of said main equalizer-beam and said secondary auxiliary beam, a clevis having spaced laterally-extending apertures and having means for attachment to the plow or other apparatus to be operated, a draft-link for coupling detachably to said clevis-apertures and provided with spaced transverse apertures, a brace member between said draft-bar and clevis, and means for coupling said draft-bar adjustably to said draft-link.

In testimony that I claim the foregoing as my own I have hereto affixed my signature in the presence of two witnesses.

ABEL M. KINDWALL.

Witnesses:
   O. E. GULBRANSON,
   A. GULBRANSON.